United States Patent
Manroa

(10) Patent No.: US 7,966,014 B1
(45) Date of Patent: Jun. 21, 2011

(54) METHOD AND COMPUTER-READABLE MEDIUM FOR MANAGING ROAMING RESTRICTIONS IN A WIRELESS ENVIRONMENT

(75) Inventor: Arun Manroa, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 570 days.

(21) Appl. No.: 11/401,247

(22) Filed: Apr. 11, 2006

(51) Int. Cl.
*H04W 4/00* (2009.01)

(52) U.S. Cl. ..... 455/433; 455/410; 455/411; 455/414.2; 455/414.1; 455/432.1; 455/432.2; 455/565; 455/406

(58) Field of Classification Search .......... 455/436, 455/406, 414.1, 414.2, 410, 411, 432.1, 432.3, 455/433, 565
See application file for complete search history.

(56) References Cited

U.S. PATENT DOCUMENTS

| | | | | |
|---|---|---|---|---|
| 5,432,841 A | * | 7/1995 | Rimer | 455/457 |
| 5,862,471 A | * | 1/1999 | Tiedemann et al. | 455/406 |
| 5,884,172 A | * | 3/1999 | Sawyer | 455/435.1 |
| 5,991,621 A | * | 11/1999 | Alperovich | 455/433 |
| 6,208,872 B1 | * | 3/2001 | Schmidt | 455/518 |
| 6,230,017 B1 | * | 5/2001 | Andersson et al. | 455/456.6 |
| 6,253,081 B1 | * | 6/2001 | Koster | 455/433 |
| 6,393,283 B1 | * | 5/2002 | Morgan | 455/433 |
| 6,560,455 B2 | * | 5/2003 | Amin et al. | 455/432.3 |
| 6,564,055 B1 | * | 5/2003 | Hronek | 455/433 |
| 6,904,285 B2 | * | 6/2005 | Drozt et al. | 455/450 |
| 6,920,326 B2 | * | 7/2005 | Agarwal et al. | 455/445 |
| 7,062,270 B1 | * | 6/2006 | Dalvie et al. | 455/433 |
| 7,321,768 B2 | * | 1/2008 | Armbruster et al. | 455/432.1 |
| 7,409,210 B2 | * | 8/2008 | Peglion | 455/432.1 |
| 2003/0083991 A1 | * | 5/2003 | Kikinis | 705/40 |
| 2003/0092440 A1 | * | 5/2003 | Warrier et al. | 455/432 |
| 2003/0207690 A1 | * | 11/2003 | Dorenbosch | 455/445 |
| 2004/0072578 A1 | * | 4/2004 | Keutmann et al. | 455/456.1 |
| 2004/0190535 A1 | * | 9/2004 | Albal et al. | 370/401 |
| 2005/0043012 A1 | * | 2/2005 | Benco et al. | 455/406 |
| 2005/0113091 A1 | * | 5/2005 | Rodriguez et al. | 455/436 |
| 2005/0192034 A1 | * | 9/2005 | Munje | 455/458 |
| 2005/0243754 A1 | * | 11/2005 | Saeed et al. | 370/328 |
| 2006/0148503 A1 | * | 7/2006 | Lasisi et al. | 455/518 |

* cited by examiner

*Primary Examiner* — Kwasi Karikari

(57) ABSTRACT

A method and computer-readable medium for controlling roaming restrictions for dispatch calling of a mobile station in a network are provided. A home location register receives a dispatch application processor identifier and a mobile station identifier. The domain in which the dispatch application processor is located may be determined by the home location register, based upon the dispatch application processor identifier. A determination can be made whether the mobile station is authorized to operate in the domain, based upon the mobile station identifier. If the mobile station is not authorized to operate in the domain, the mobile station is prevented from operating in the domain. On the other hand, if the mobile station is authorized to operate in the domain, the operation of the mobile station may be allowed, but restricted to certain predetermined calling features.

22 Claims, 4 Drawing Sheets

METHOD AND COMPUTER-READABLE MEDIUM FOR MANAGING ROAMING RESTRICTIONS IN A WIRELESS ENVIRONMENT

BACKGROUND OF THE INVENTION

The present invention relates to assigning roaming restrictions in a wireless environment. More particularly, the present invention relates to assigning roaming restrictions for dispatch calling, wherein a home network of a mobile station controls the roaming and feature restrictions of the mobile station, whether the mobile station is in a foreign network or the home network. The roaming and feature restrictions can be affected on the complete foreign network or specific geographical areas of the foreign network. Similarly, the roaming and feature restrictions can be applied to specific geographical areas of the home network.

Generally, operators of some communication networks have an inability to assign roaming restrictions for features in foreign networks, e.g., networks in foreign countries or in specific geographic locations. For example, in an iDEN network, such as that owned and operated by Sprint Nextel Corporation of Reston, Va., a home network of a mobile station cannot control the roaming restrictions and features of the mobile station when it is roaming from its home network in one country to a foreign network in another country or in different geographical areas of the home network.

It is the responsibility of the Home Network to authorize the mobile user when the user is roaming in foreign and/or home networks. The foreign network relies on the information about the mobile user it receives from the home network during registration or pushed by the home network, triggered by a provisioning change in the home network. Further, the foreign network might allow the mobile station to use certain calling features that it is not authorized to use in the foreign network. For example, the use of encryption technologies might be restricted by the local laws of the foreign network; and even though a visiting mobile user may have subscribed to the "encryption" feature in the home network, the feature has to be restricted while the user is in that foreign network. Inability of the home network to restrict roaming and certain features in the foreign network can result in financial losses to the home network operator due to the lost revenue collection from the mobile user (e.g., the user may claim that he/she never subscribed to roaming and hence is not responsible to pay for the use in a foreign network). Financial loss to the home operator could also be brought by lawsuits in foreign networks due to non-compliance of foreign laws. Thus, the inability of the home network to control the roaming restrictions and features for the mobile station when the mobile station is in a foreign network is a problem.

SUMMARY OF THE INVENTION

The present invention provides a method and computer-readable medium for controlling roaming restrictions for dispatch calling of a mobile station.

In accordance with exemplary embodiments of the present invention, during registration a home location register receives a dispatch processor identifier and a mobile station identifier. Based upon the dispatch processor identifier, the domain of the dispatch processor may be determined. Whether the mobile station is authorized to operate in the domain may be determined based upon the mobile station identifier. If the mobile station is not authorized to operate in the domain, the mobile station is prevented from operating. On the other hand, if the mobile station is authorized to operate in the domain, the operation of the mobile station may be allowed, but restricted to certain predetermined calling features.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
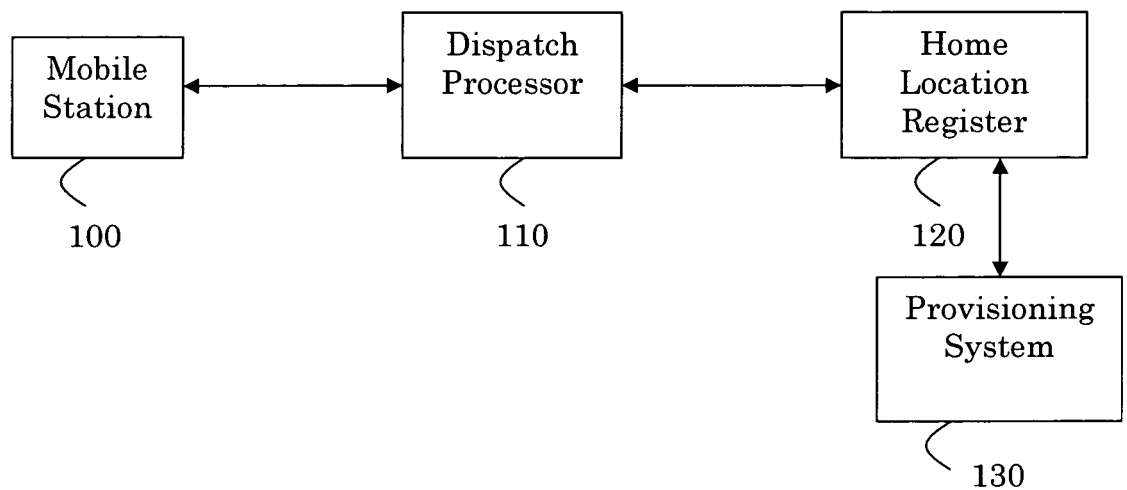
FIG. 1 illustrates an exemplary embodiment of a wireless network in accordance with the present invention.

FIG. 1 illustrates an exemplary embodiment of a wireless network in accordance with the present invention. The exemplary network of FIG. 1 includes a mobile station, a dispatch processor (e.g., a dispatch application processor), a home location register and a Provisioning System. Although only one of each element of the wireless network is illustrated, the wireless network may include a plurality of mobile stations, dispatch application processors, and home location registers. The mobile station may be, for example, an iDEN handset. An exemplary embodiment of the operation of the mobile station, dispatch application processor, and home location register of FIG. 1 is described below in reference to FIGS. 2-4. The Provisioning System 130 allows the home operator to configure for each mobile user the domains (i.e., home and/or foreign) and the complete list of allowed and restricted features for each domain.

Figure 2:
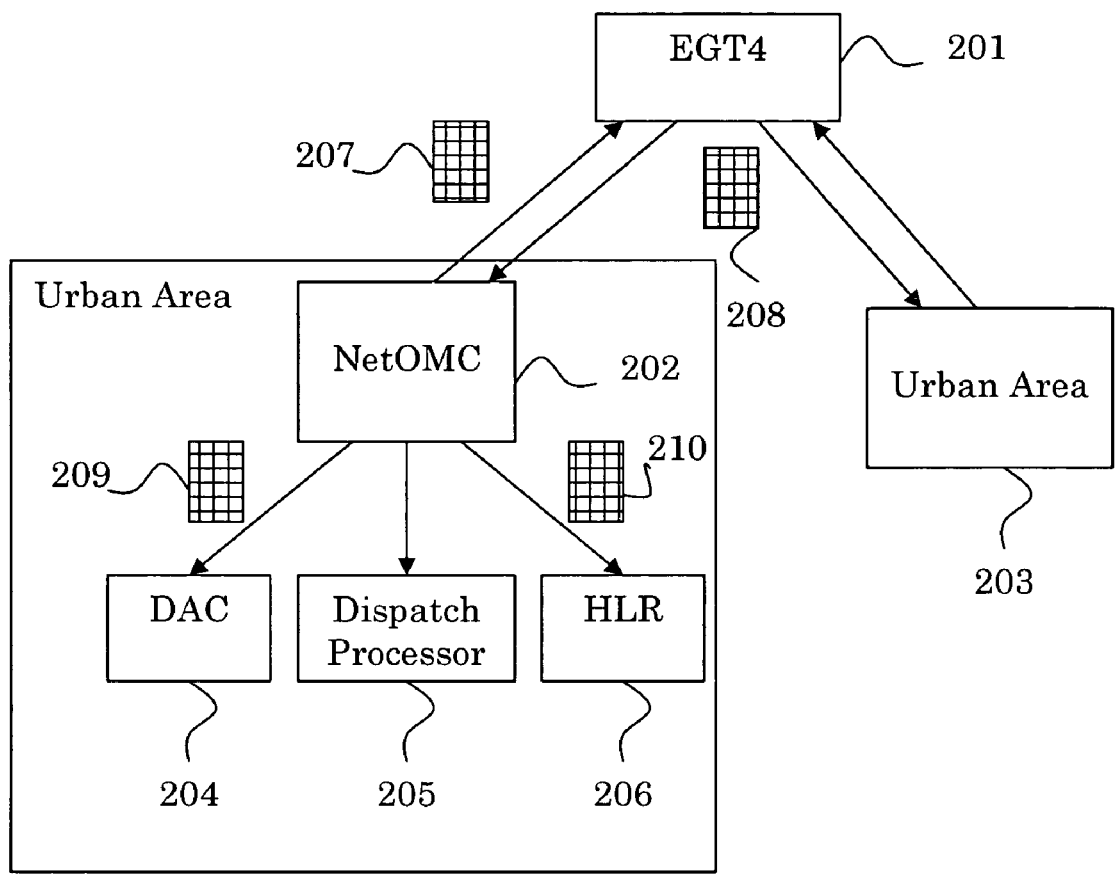
FIG. 2 illustrates an exemplary EGT4 distribution process in an iDEN network in accordance with the present invention.

FIG. 2 illustrates an exemplary enhanced global title translation table tool (EGT4) distribution process in an iDEN network in accordance with the present invention. An EGT4 is a central entity in a network that contains databases and tables that facilitate routing of calls in the network. The EGT4 provides functionality similar to that of a Domain Name Server (DNS) in an IP Internet environment. The DNS converts alphanumeric addresses to IP addresses. The EGT4 provides domain names to IP conversion routing tables for UFMI (Urban Fleet Mobile Identifier) to iHLR mapping, IMSI (International Mobile Subscriber Identity) to iHLR mapping, DAP (Dispatch Application Process) ISDN to IP address/Domain mapping and iHLR to IP/Domain mapping. The EGT4 differs from the DNS in that the EGT4 pushes the routing tables to all of the network elements in the system. The push mechanism of the EGT4 facilitates faster call setup, because the network elements do not have to query a routing table during call setup. This is particularly important for latency sensitive applications such as dispatch calling. An EGT4 201, which comprises a server, is responsible for maintaining this data for an entire iDEN network. Typically, each country has its own EGT4 201, which provides routing data to a plurality of domains within the iDEN network.

Each domain accessed by the EGT4 201 is identified by a domain ID and a domain name. The domain IDs are unique and are assigned by the EGT4 201. In the current iDEN Network design although the domain IDs are unique, they are not necessarily fixed, i.e., a domain ID may change after a download of data from the EGT4 201. In an exemplary embodiment of the present invention, the domain IDs and the domain names are globally unique and fixed.

In the EGT4 201, an operator inputs tables of data associated with mobile stations, dispatch application processors, and home location registers, for example. As illustrated in FIG. 2, the EGT4 201 may distribute data to a Network Operations and Maintenance Center (NetOMC) 202 and to urban areas 203 in the network. The NetOMC 202 is a network element that is a management subsystem for establishing and maintaining information about the iDEN network, which can be presented to a system operator. The NetOMC 202 may further distribute the data to dispatch audio controller 204 (e.g., an iDEN dispatch audio controller), dispatch processor 205 (e.g., a dispatch application processor), and home location register (HLR) 206 (e.g., an iDEN HLR). Although only one of each of the urban area 203, DAC 204, dispatch processor 205, and HLR 206 are illustrated, a plurality of these elements may be included in the iDEN system.

FIG. 2 illustrates home network (HN) urban area network element (NE) data 207 being transmitted from the NetOMC 202 to the EGT4 201. The network elements are the hardware and software that form the operational components of the iDEN system. Also illustrated is home network global title translation (HN GTT) data (routing data) 208 being distributed to the NetOMC 202 and the urban areas 203 in the iDEN network. Once the NetOMC receives the routing data 208 from the EGT4 201, it is responsible for segregating the data based on the downstream network elements, i.e., the type and function of the network element would determine the routing data that is distributed to that element. For example, FIG. 2 illustrates routing data 209 being distributed from the NetOMC 202 to the DAC 204, and routing data 210 being distributed to the HLR 206. Similarly, a subset of routing data is sent to the dispatch processor 205. According to exemplary embodiments of the present invention, the NetOMC 202 and HLR 206 store the domain IDs and domain names that were generated (or provisioned) in the EGT4 201; specifically, the HLR stores the DAP ISDN address to the Domain ID/Name mapping.

From the data distributed by the EGT4 201, the HLR 206 can be made aware of changes in the iDEN network regarding dispatch application processors, international mobile subscriber identifier (IMSI) ranges, and Urban Fleet Member ID (UFMI) ranges, DAP ISDN address and the Domain mappings.

Figure 3:
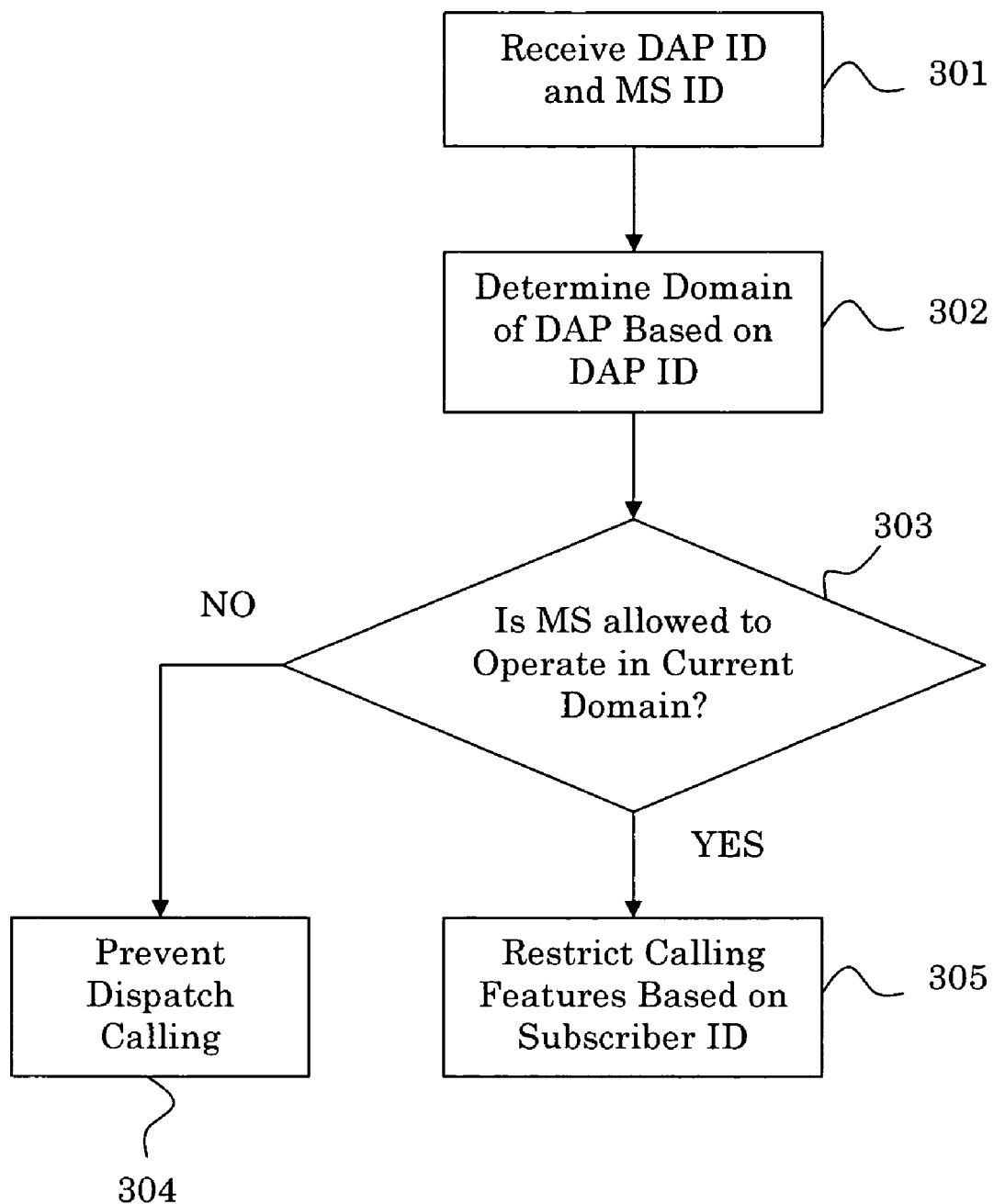
FIG. 3 illustrates an exemplary embodiment of a method in accordance with the present invention.

FIG. 3 illustrates an exemplary embodiment of a method in accordance with the present invention. In step 301 of FIG. 3, a dispatch application processor identifier (i.e., the ISDN address) and a mobile station identifier (i.e., the IMSI address) are received by a home location register in the registration message that is generated by the DAP when the mobile user roams to that domain. In step 302, the home location register determines a domain in which a dispatch application processor is located using the DAP ISDN address to the domain mapping table that was pushed from the EGT4 as shown in FIG. 2. In step 303, the home location register determines whether the mobile station is authorized to operate in the domain, based upon the mobile station identifier and the attributes of each individual mobile user provisioned by the Provisioning System 130 (FIG. 1). If the mobile station is not authorized to operate in the domain, in step 304, the mobile station is prevented from operating in the domain. On the other hand, if it is determined in step 303 that the mobile station is allowed to operate in the domain, the home location register allows the mobile station to operate in the domain, but restricts the calling features available to the mobile station, in step 305, based upon the mobile station identifier and provisioned attributes.

Figure 4:
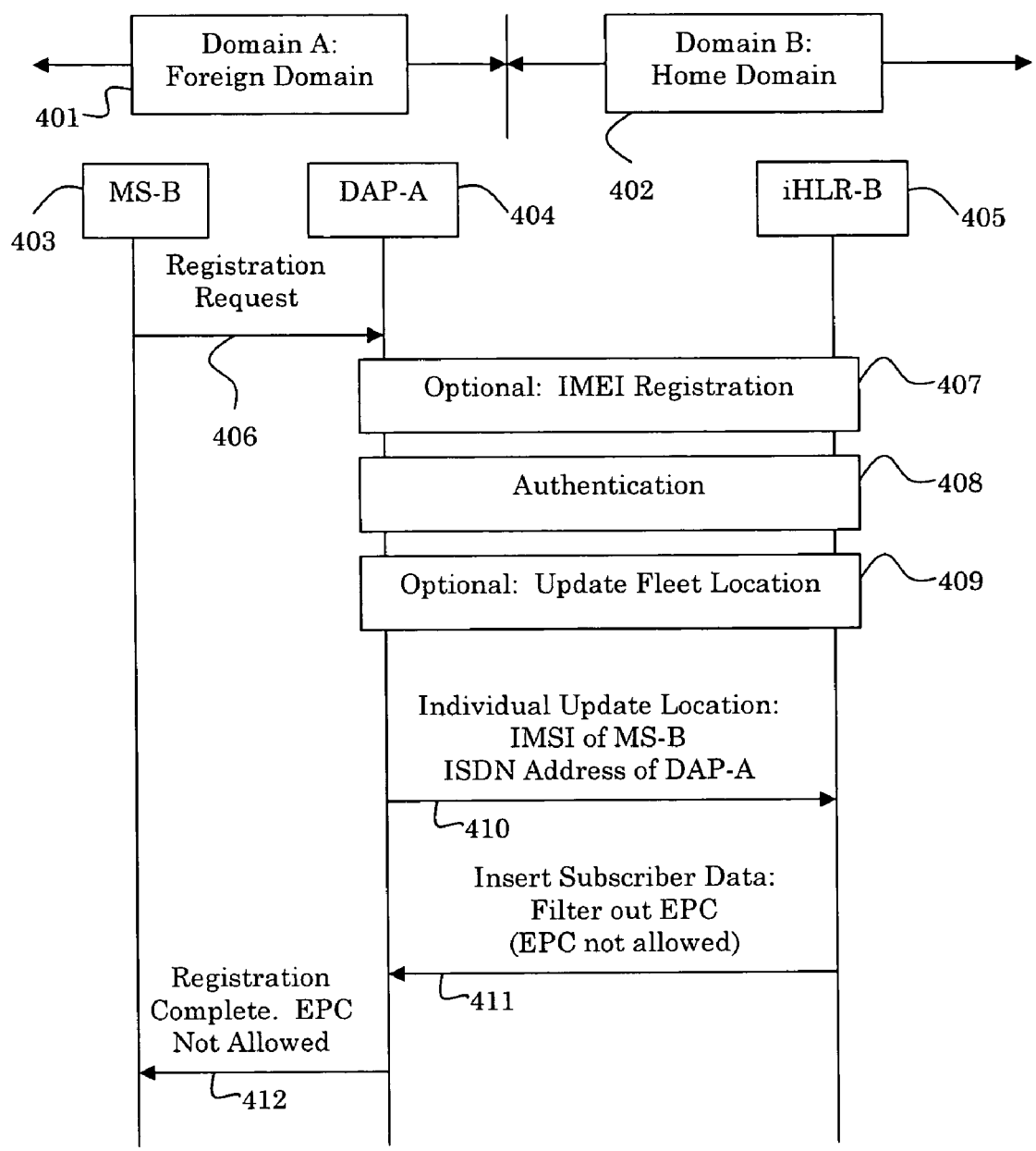
FIG. 4 illustrates an exemplary embodiment of a call flow of a mobile station in a foreign network/domain in accordance with the present invention.

FIG. 4 illustrates an exemplary embodiment of a call flow of a mobile station in a foreign network/domain in accordance with the present invention. In FIG. 4, Domain A 401 is a foreign domain, and Domain B 402 is the home domain of the mobile station MS-B 403. When the MS-B is powered on and is in the Radio Frequency coverage area of Domain A, the mobile station MS-B 403 sends a registration request to a dispatch application processor DAP-A 404 in Domain A 401. Note that the message actually propagates through a BTS (Base Transceiver System) and other routing equipments, but these are not depicted as those elements and their functions are not affected by the present invention. Further the selection of the DAP-A 404 in the foreign domain could be achieved by a number of methods that, though necessary, does not affect the present invention. DAP-A 404 sends authentication information 408 and individual location update information 410, e.g., the IMSI of MS-B and the ISDN address of DAP-A, to the iDEN home location register (iHLR-B) 405 of Domain B 402. DAP-A 404 may also send IMEI registration information 407 and/or fleet location update information 409 to the iHLR-B 405. The iHLR-B 405 can verify the home domain of DAP-A 404, based on the domain ID and/or domain name; as explained above, this mapping is a key step and is facilitated by the routing data pushed by the EGT4. The iHLR-B 405 will also verify which set of features the MS-B 403 is allowed to use while it is in the foreign Domain A 401. As described above, data related to the location of the DAPs and the features allowed to the mobile stations in foreign networks is sent to the iHLRs during the EGT4 distribution process. As illustrated in FIG. 4, the mobile station is allowed to operate in the foreign domain, but the mobile station is restricted from using the encrypted private calling (EPC) feature while in the foreign domain. In call flow operation 411, the iHLR-B 405 sends subscriber data to the DAP-A 404, which filters out the EPC. In operation 412, a registration complete signal is sent from the DAP-A 404 to the MS-B 403. In the exemplary embodiment illustrated in FIG. 4, the MS-B 403 is not allowed to use the EPC feature while in the foreign Domain A 401.

Other examples of features that may be restricted from mobile stations in foreign networks include, but are not limited to, the following: private call service, cross fleet service, call alert service, group call service, emergency service, packet data service, and individual dispatch long distance calling.

In an exemplary embodiment of the present invention, a network may be divided into a plurality of domains and dispatch calling and dispatch calling feature may be further geographically restricted within the network.

Although exemplary embodiments have been described in connection with an iDEN network, the present invention is equally applicable to other types of dispatch and/or interconnect networks.

In another exemplary embodiment of the present invention, there is a computer-readable medium encoded with a computer program for controlling roaming restrictions for dispatch calling of a mobile station in a network. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, or any other memory chip or cartridge.

An exemplary embodiment of a computer-readable medium encoded with a computer program for controlling roaming restrictions for dispatch calling of a mobile station in an iDEN network is illustrated in FIG. 3, which is described above.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling roaming restrictions for dispatch calling of a mobile station in a network, comprising the acts of:
    receiving at a home location register of the mobile station a dispatch processor identifier identifying a dispatch application processor that supports a plurality of mobile stations for dispatch calling, and a mobile station identifier that identifies the mobile station;
    determining at the home location register a domain of the dispatch application processor based upon the dispatch processor identifier by accessing data stored in the home location register which is sent to the home location register during an enhanced global title translation table tool (EGT4) distribution process;
    determining at the home location register whether the mobile station is authorized to operate in the domain, based upon the mobile station identifier;
    sending from the home location register to the dispatch application processor subscriber data including calling features of the mobile station which are restricted in the domain;
    preventing at the dispatch application processor the mobile station from operating in the domain, if the mobile station is not authorized to operate in the domain; and
    restricting at the dispatch application processor calling features available to the mobile station based on the subscriber data and the mobile station identifier, if the mobile station is authorized to operate in the domain.

2. The method of claim 1, wherein the calling features comprise at least one of encrypted private calling, private call service, cross fleet service, call alert service, group call service, emergency service, packet data service, and individual dispatch long distance calling.

3. The method of claim 1, wherein the domain comprises one of a foreign network as a whole, a specific geographical area of the foreign network, and a specific geographical area of a home network.

4. The method of claim 3, wherein the foreign network comprises a wireless network disposed in a country other than a home country of the mobile station.

5. The method of claim 3, wherein the home network comprises a wireless network in a home country of the mobile station.

6. The method of claim 1, wherein the home location register is disposed in a foreign network.

7. The method of claim 6, wherein the foreign network comprises a wireless network disposed in a country other than a home country of the mobile station.

8. The method of claim 1, wherein the dispatch processor identifier is an ISDN address.

9. The method of claim 8, wherein the mobile station identifier is an international mobile subscriber identifier address.

10. A method for controlling roaming restrictions for dispatch calling of a mobile station in a network, comprising the acts of:
    receiving at a home location register of the mobile station a dispatch processor identifier identifying a dispatch application processor that supports a plurality of mobile stations for dispatch calling, and a mobile station identifier that identifies the mobile station;
    determining at the home location register a domain of the dispatch application processor based upon the dispatch application processor identifier;
    determining at the home location register whether the mobile station is authorized to operate in the domain, based upon the mobile station identifier by accessing data stored in the home location register which is sent to the home location register during an enhanced global title translation table tool (EGT4) distribution process; and
    restricting at the dispatch application processor calling features available to the mobile station, based upon the mobile station identifier, if the mobile station is authorized to operate in the domain.

11. The method of claim 10, wherein the calling features comprise at least one of encrypted private calling, private call service, cross fleet service, call alert service, group call service, emergency service, packet data service, and individual dispatch long distance calling.

12. The method of claim 10, wherein the domain comprises one of a foreign network as a whole, a specific geographical area of the foreign network, and a specific geographical area of a home network.

13. The method of claim 12, wherein the foreign network comprises a wireless network disposed in a country other than a home country of the mobile station.

14. The method of claim 12, wherein the home network comprises a wireless network in a home country of the mobile station.

15. The method of claim 10, wherein the home location register is disposed in a foreign network.

16. The method of claim 15, wherein the foreign network comprises a wireless network disposed in a country other than a home country of the mobile station.

17. The method of claim 15, wherein the foreign network comprises a wireless network disposed in a geographic area other than a home area of the mobile station.

18. The method of claim 10, wherein the dispatch processor identifier is an ISDN address.

19. The method of claim 18, wherein the mobile station identifier is an international mobile subscriber identifier address.

20. A non-transitory computer-readable medium encoded with a computer program for controlling roaming restrictions for dispatch calling of a mobile station in a network, the computer program comprising instructions for:

receiving at a home location register of the mobile station a dispatch processor identifier identifying a dispatch application processor that supports a plurality of mobile stations for dispatch calling, and a mobile station identifier that identifies the mobile station;

determining at the home location register a domain of the dispatch application processor based upon the dispatch processor identifier by accessing data stored in the home location register which is sent to the home location register during an enhanced global title translation table tool (EGT4) distribution process;

determining at the home location register whether the mobile station is authorized to operate in the domain, based upon the mobile station identifier;

sending from the home location register to the dispatch application processor subscriber data including calling features of the mobile station which are restricted in the domain;

preventing at the dispatch application processor the mobile station from operating in the domain, if the mobile station is not authorized to operate in the domain; and restricting at the dispatch application processor calling features available to the mobile station based on the subscriber data and the mobile station identifier, if the mobile station is authorized to operate in the domain.

21. The computer-readable medium of claim 20, wherein the dispatch processor identifier is an ISDN address.

22. The computer-readable medium of claim 21, wherein the mobile station identifier is an international mobile subscriber identifier address.

* * * * *